United States Patent Office 2,964,526
Patented Dec. 13, 1960

2,964,526

HALOGEN DERIVATIVES OF 1,4-DIAZOBICYCLO-(2.2.2)-OCTANE

Elbert C. Herrick, Media, Pa., assignor to Houdry Process Corporation, Wilmington, Del., a corporation of Delaware No Drawing. Filed June 16, 1958, Ser. No. 742,055

4 Claims. (Cl. 260—268)

This invention relates to N-halo derivatives, and particularly to the bromo and iodo derivatives of the cage compound triethylene diamine, sometimes designated as 1,4-diazabicyclo octane, a heterocyclic cage compound in which the two nitrogens are joined by three ethylene groups. The tertiary amine employed as the starting material of the method of the present invention has the formula $N(CH_2CH_2)_3N$ and accordingly resembles $HC(CH_2CH_2)_3N$ known as quinuclidine. Much literature has been published concerning quinuclidine derivatives, such as quinine. This invention is concerned with the N-iodo and N-bromo derivatives of triethylene diamine which are tetrahalo instead of dihalo derivatives. That is, the iodo material of the present invention has the formula $I_2N(CH_2CH_2)_3NI_2$ and the corresponding bromo material has the formula $Br_2N(CH_2CH_2)_3NBr_2$. It is convenient to describe these materials as compounds, notwithstanding the fact that the properties suggest that such materials partake of the nature of adducts, complexes, or related derivatives. Materials designated as complexes have previously been prepared from tertiary amines and iodine. For example, S. Nagakura describes a complex of iodine and triethylamine at J.A.C.S. 80, 520 (1958) and discusses dipole moments, entropy, heat of reaction, equilibrium constant, and other features of the compounds (designated by Nagakura as complexes) of tertiary amines and iodine.

Scientists concerned with reaction mechanisms have studied the stereo chemistry of cage compounds having bridgehead nitrogen atoms, because they have wanted to learn the influence of the fact that the three covalent bonds of such nitrogen atoms are fixedly maintained. Such valence bonds have relative angles corresponding to the tetrahydral valence bonds. Under appropriate conditions, a nitrogen atom can assert a valence of 5 instead of 3. In compounds with nitrogen at the apex or bridgehead of a cage, the potentially reactive valence bonds of the nitrogen differ from the potentially reactive nitrogen valence bond of ordinary compounds. Those reaction mechanisms involving points of reactivity at both ends of the axis of a nitrogen atom capable of oscillating the tetrahedral valence bonds cannot occur when the cage structure stericly hinders one end of such axis of the nitrogen atom. Reaction mechanism chemists have theorized that the nitrogen atom of the cage structure can undergo only those reactions which can occur at the exposed apex of the nitrogen atom. Such studies would have justified the prediction that compounds such as $I_2N(CH_2CH_2)_3NI_2$ could not exist, but surprisingly, such compounds are prepared in accordance with the present invention.

Some of the literature references relating to the preparation and/or reactions of triethylene diamine include:

(1) Hromatka, Ber., 75, 1302 (1942).
(2) Hromatka and Engel, Ber., 76, 712 (1943).
(3) Mann and Mukheyee, J. Chem. Soc. 1949, 2298.
(4) Hromatka and Kraupp, Monatsh, 82, 880 (1951).
(5) McElvain and Bannister, J. Am. Chem. Soc. 76, 1126 (1954).
(6) Ishiguro, Kitamura, Matsumura, and Ogawa, J. Pharm. Soc. Japan 75, 1318–21 (1955).
(7) U.S. Patent 2,937,176, which issued May 17, 1960 from application, Serial No. 628,723 filed Dec. 17, 1956 (assigned to Houdry Process Corporation).

Heretofore, N-halo compounds have been prepared for use as germicides, bleaching agents and for other purposes. Recently, advantageous results have been obtained using the N-chloro derivatives of 1,3 diamino five-membered rings, such as hydantoin.

In accordance with the present invention the novel compounds N,N'-tetrabromo triethylene diamine and N,N'-tetraiodo triethylene diamine are prepared. It is surprising that these materials (designated as compounds notwithstanding their "adduct" nature) can be prepared. Inasmuch as the compounds contain nearly 82% iodine and 74% bromine respectively, they constitute superior carriers for these halogens. The controlled reactivity of the compounds of the present invention makes them not merely easier to package and use than the free halogens, but also more suitable reagents when a mild brominating or iodinating agent is desired. The compounds appear to be surprisingly stable in neutral or alkaline media, but to release halogen readily in the presence of acid. Hence, they are even more useful than the free halogens. For example, the compounds of the present invention have advantages in the titrametric analysis for the bromine number or iodine number of unsaturated fatty acids and/or trigycerides. The tetrahalo triethylene diamines of the present invention can be utilized as germicides, bleaching agents, halogenating agents and for a variety of the purposes for which carbon tetrachloride solutions of the free halogen have heretofore been employed.

In accordance with the method of the present invention, a solution of triethylene diamine in an appropriate organic solvent is prepared and treated with a free halogen selected from the group consisting of bromine and iodine at a temperature within the range from −50° C. to 150° C., whereby the halogen reacts with the triethylene diamine to form the N,N'-tetrahalo derivative which is then recovered from the reaction mixture by appropriate steps.

The invention can be clarified by reference to a plurality of examples.

Example 1

About 1.5 g. of triethylene diamine (marketed by Houdry Process Corporation, Philadelphia) was dissolved in a solvent mixture consisting of one (1) ml. of water, 50 ml. of carbon tetrachloride, and 35 ml. of ethanol. Shortly after the addition of 7.5 g. of iodine to said solution, an orange product precipitated. Not all of the iodine appeared to have reacted. The crude product was purified by filtration, washing and drying to prepare a sample pure enough for identifying its structure. The initial reaction mixture was filtered to recover the precipitate, which was washed with about 200 ml. of ethanol. The orange residue remaining after such thorough washing was dried for five hours in a vacuum oven. The thus purified sample amounted to 5.96 g. Analysis of the compound established that it was $I_2N(CH_2CH_2)_3NI_2$. Anal. Calcd. for $C_6H_{12}N_2I_4$: I, 81.9. Found: I, 83.2±0.6.

The infra red spectrum of the iodinated triethylene diamine has been taken and has been found to be markedly different from the spectrum of triethylene diamine and also quite different from the product resulting from the reaction of chlorine with a solution of triethylene diamine.

Several qualitative tests have been carried out on the thus prepared iodinated triethylene diamine product. This compound is nearly insoluble in an aqueous solution of potassium iodide and thus differs from free iodine. Addition of starch solution to an aqueous acetone solution of tetraiodotriethylene diamine gives a strong test for free iodine thus demonstrating how readily the solution reacts as if it contained free iodine. When this compound was titrated with an acidic solution of sodium thiosulfate, using starch as an indicator, the presence of four reactive iodines per triethylene diamine was confirmed.

A weighed sample of $I_2N(CH_2CH_2)_3NI_2$ was dissolved in a mixture of acetic acid and a minor amount of an aqueous solution of potassium iodide. The solution was titrated with a solution of sodium thiosulfate in order to analyze for the percentage of reactive iodine in the sample. Two analyses showed the presence of 83.09% and 82.7% iodine, providing further confirmation that the structure was $I_2N(CH_2CH_2)_3NI_2$.

*Example II*

About 5.6 g. (0.05 mol) of triethylene diamine was dissolved in 200 ml. of carbon tetrachloride, to which was added 100 ml. of a solution of carbon tetrachloride containing 16 g. (0.1 mol) of bromine. A yellow solid was precipitated, which product was separated by filtration. After purification of the crude product by washing and drying, 20.5 g. of the compound was recovered. A sample of the compound was analyzed, and found to be $C_6H_{12}N_2Br_4$.

Calculated for $C_6H_{12}N_2Br_4$: Br, 74%. Found: 74.2±0.3%.

The presence of four active bromines per triethylene diamine was also established by tritrametric analysis.

The compound is stable thermally in neutral or slightly basic media, and can be subjected to refluxing carbon-tetrachloride at 76° C. without decomposition, but readily releases bromine in dilute acid.

Obviously many modifications and variations of the invention as hereinbefore set forth may be made without departing from the spirit and scope thereof, and therefore only such limitations should be imposed as are indicated in the appended claims.

The invention claimed is:
1. The chemical compound

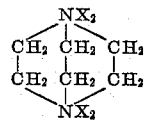

wherein X is selected from the group consisting of Br and I.

2. The chemical compound N,N-tetrabromo-1,4-diazabicyclo-(2.2.2.)-octane.

3. The chemical compound N,N-tetraiodo-1,4-diazabicyclo-(2.2.2.)-octane.

4. The method of preparing a compound of the class of claim 1 which method consists essentially of the steps of dissolving 1,4-diazabicyclo-(2.2.2.)-octane in an inert organic solvent; introducing elementary halogen selected from the group consisting of bromine and iodine to such solution at a temperature below 150° C., the quantity of halogen being sufficient to form the tetrahalo derivative of the 1,4-diazabicyclo-(2.2.2.)-octane; and recovering the N,N-tetrahalo derivative of 1,4-diazabicyclo-(2.2.2.)-octane from said solution.

References Cited in the file of this patent
UNITED STATES PATENTS
2,472,361   Arsem ---------------- June 7, 1949

OTHER REFERENCES
Hromatka, Chemische Berichte, vol. 75, pp. 1302–1309 (1942).